United States Patent [19]
Botnick et al.

[11] 3,781,034
[45] Dec. 25, 1973

[54] VEHICLE SAFETY HARNESS RIGGING

[75] Inventors: Irlin Botnick, 3155 Kersdale Rd., Pepper Pike, Ohio 44124; Philip D. Golrick, Cleveland Heights, Ohio

[73] Assignee: said Botnick, by said Golrick

[22] Filed: June 3, 1971

[21] Appl. No.: 149,645

[52] U.S. Cl. .................................. 280/150 SB
[51] Int. Cl. .................................. B60r 21/02
[58] Field of Search ............... 280/150 SB; 297/388

[56] References Cited
UNITED STATES PATENTS
| | | | |
|---|---|---|---|
| 3,583,726 | 6/1971 | Lindblad | 280/150 SB |
| 3,506,083 | 4/1970 | Botnick | 280/150 SB |
| 3,411,602 | 11/1968 | Royce | 180/82 |

*Primary Examiner*—Robert R. Song
*Attorney*—Ely, Golrick & Flynn

[57] ABSTRACT

A forwardly swinging and hinged automobile door secures one end of a belt portion of safety strap rigging for an adjacent seat position by door mounted mechanism including a linkage engaging a door-framing fixed part of the vehicle; whereby the belt strap portion proximate the door space, with any shoulder strap connected thereto, is swung away from the seat upon door opening to facilitate entering and leaving the seat, and upon door closing is brought automatically into proper passenger restraining disposition relative to the seat. One end of the belt strap (and a ceiling-anchored end of any belt connected shoulder strap) is secured reeled on a respective strap and anchoring reel allowing normal movement of a person in the seat, but locking up the belt end, upon sudden vehicle deceleration either by incipient rapid payout under body exerted force on the belt or by a deceleration-sensing inertial lock in the reel.

9 Claims, 11 Drawing Figures

INVENTORS
IRLIN BOTNICK
PHILIP D. GOLRICK
BY
Ely, Golrick & Flynn
ATTORNEYS

INVENTORS
IRLIN BOTNICK
PHILIP D. GOLRICK
BY
Ely, Golrick & Flynn
ATTORNEYS

INVENTORS
IRLIN BOTNICK
PHILIP D. GOLRICK
BY

*Ely, Golrick & Flynn*
ATTORNEYS

VEHICLE SAFETY HARNESS RIGGING

Concern over some decades for auto vehicle occupant safety, in event of collisions or other accidents, has led to considerable ingenuity in padding and structurally strengthening the occupant surrounding environment, improvement in security of seats and door closures, emergency activated cushioning devices, and in now quite widely installed occupant restraining harnesses or devices such as seat belts, shoulder straps and combinations of these.

Many years' experience has shown that automotive safety harness equipment frequently is not utilized by many people for various reasons, conscious or unconscious, such as impatience with even minimal feeling of restraint, carelessness, or even a total unconcern for personal safety.

Thus to overcome non-use arising from any inconvenience in adjusting a seat belt or shoulder strap to the user's size, strap reels have been provided in effect automatic in strap-length adjustment; to overcome that due to discomfort or a feeling of undue restraint in normal shifting in the seat, various reel types have been developed which allow some free in and out reeling of the strap under normal conditions of bodily movement, but which lock up either upon a short run-out, or upon sudden outward belt movement as the passenger's body shifts in an incipient motion due to vehicle deceleration, or through a deceleration responsible reel lock device.

Though such improvements have obviated many causes of non-use since a strap buckling or hooking action is required of the passenger, the safety function still is frequently defeated by forgetfulness, carelessness or a stubbornly independent refusal to use the equipment. Hence recently there have been developed so-called passive systems more or less beyond the passenger's control, to insure the operative disposition of the strap elements at time of need without any specific action on the part of the passenger.

Thus, for example, seat belt arrangements have been proposed wherein a seat belt is rigged in an unobtrusive location or disposition, so that the passenger ("passenger" comprehending here-in a driver and non-driver occupant except where context requires otherwise) may enter and leave the seat position without manipulation of the equipment; wherein normally, while in the seat position, the pasenger is not contacted or restrained by the rigging, but upon an emergency condition or deceleration through automatic sensing and control devices the equipment is acutated to bring the restraints about a passenger.

By another approach, for example, one seat belt end is effectively anchored in the adjacent, front-edge-hinged door and the other end is secured at the other side of the seat position, in such a manner that when the door is closed, the belt or strapping is disposed in operative location across the seat; while, however, the door may be opened with belt unreeling at one or the other end; the end connections being thus maintained and the belt being then reeled in during door closure to restore the belt operative disposition. Advantageously this arrangement usually also helps to retain the door closed under impact conditions. In such cases, means have been proposed or used to lock the extensible portion of the belt automatically either upon starting the engine, or at least under the behicle deceleration conditions of the usual emergency situation.

Further conducive to the passenger acceptance of such arrangements, means have been provided in the door anchoring system for the belt end to cause the belt to advance forward away from the seat as the door is opened thus to swing the doorward end of the belt (and any shoulder strap end attached thereto) further forward away from the seat beyond what excursion would be attained when the belt end is anchored to a substantially fixed point on the door.

The present invention is more particularly concerned with the last described type of automotive vehicle safety harness rigging wherein, upon opening of the front edge hinged door usual in modern automotive passenger vehicles, the door end of the seat belt is moved, with or without a vertical component, forwardly away from the seat to facilitate passenger ingress and egress, but upon door closure is returned automatically to operative disposition across the seat.

More particularly the present invention is directed to an improvement of the described type of rigging wherein movement of the door end of the belt toward and away from the seat is attained by an actuating linkage between the door and the stationary door framing region so that the desired shifting of the belt rigging, in one or the other or both senses, is atained through the enrgy imparted by the passenger to and the consequent momentum of the door as it is opened or closed, without recourse to air or electric motors, extended track systems, and the like. Moreover, in a particular embodiment of the above described broader feature of the invention as hereinafter detailed, by a further feature, even where the necessary reel for the belt is embodied in the door portion of the overall rigging installation, there is no need for electrical, vacuum or air door connections or the like for acuating, or locking up the reel, or any portion of the installation to bring it into the totally operative condition ready for an emergency situation.

It is then the general object of the present invention to provide an improved door-connected type safety harness rigging for automotive vehicles and the like.

Another object is the provision of mechanism for advancing or carrying a door anchored end portion of a seat belt or like strap rigging away from the seat position as the door is opened and returning it, as the door is closed, automatically to a proper disposition across the respective seated passenger's location; the movements for the strap portion thus derived from an actuating linkage between door mounted elements and the door-surrounding or framing fixed environment.

Other objects and advantages will appear from the following description and the drawings wherein.

Since the general automobile body structure is well known—and so also the particular structures therein, such as the door, cowling, mode of door hinging, concealing of a usual gap between the front door post face and the front edge of the door, interior finish structure and the other door-associated structures—details of these are omitted in the following discussions of the invention; and for the simplicity of the drawings and clarity of representation of the essential points of the invention the door and the surrounding structures are merely indicated schematically by outline conventions.

Figures 1, 4:
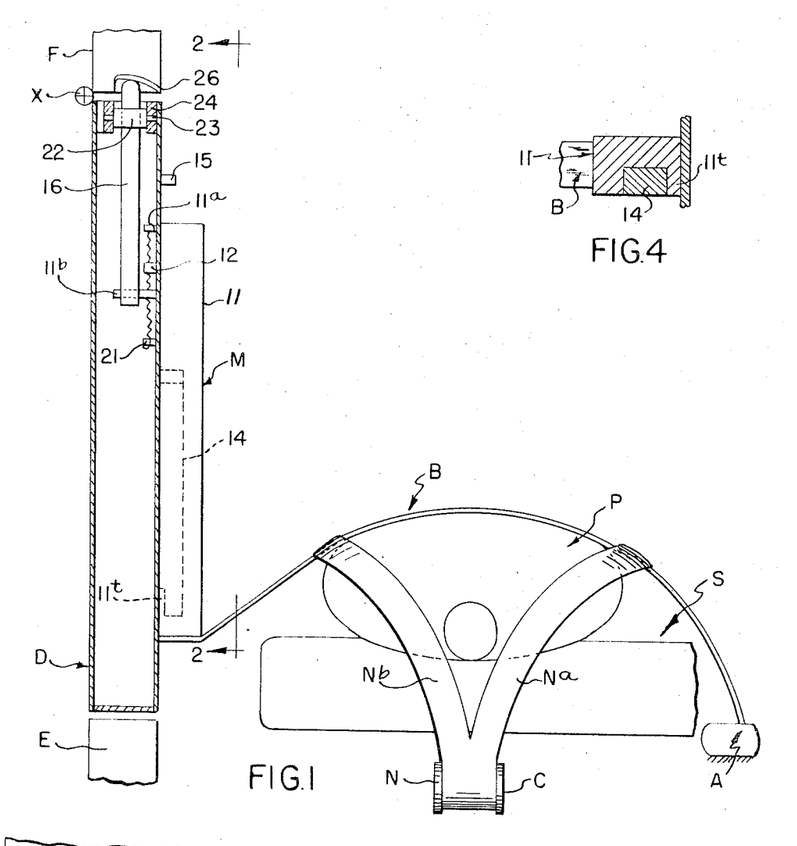
FIG. 1 is a somewhat generalized or schematical plan view representation of a door-adjacent seat region of a vehicle on which an embodiment of the invention is installed; for the door-closed condition.
FIG. 4 is a detail section taken at the line 4—4 in FIG. 2.

A first embodiment of the present invention appears in FIG. 1, a generalized or schematic fragmentary plan representation of a portion of an automobile door adjacent environment as at the driver's seat showing a seat S seating a passenger P; a forwardly swinging left door D hinged at X at its front edge to a cowl, i.e., a forward part F of the vehicle body door framing region including a fragmentarily shown back portion E as a rear post for the door; safety harness rigging including a seat belt or lap strap B shown extending from an inside anchor device A across the body of the passenger P for securment fo the other end ot the door, here in the door-mounted shiftable arm rest M comprising an element of the mechanism of the present invention; and a doubled shoulder strap arrangement comprising a strap N with upper end reeled on a reeling anchoring device C located as on the vehicle roof or ceiling, above and behind the center of the seat position, the other end of this strap dividing to pass over the shoulders of parts Na, Nb, to spaced points of respective securement on the belt. A simple single shoulder strap may of course be used running say from a similar reel C offset beyound the right shoulder region, to an attachment point on the belt to the left of the seat position center as appears in FIG. 6. The shoulder strap elements are "operatively permanently" attached to the seat belt; that is either attached permanently in the literal sense, or else only with difficulty releasable.

In the belt arrangement, the door end of the belt strap may be simply secured to the back end of the arm rest M, with the strap inner end extensibly reeled on and secured by a self-retracting reel of now well known type incorporated in the anchor device A. This reel type used at A and C, as hereinafter described, allows smooth relatively low speed unreeling, so that a door opening swing and also normal body movements of the seated person are permitted; but any sudden unreeling movement, such as would result from an incipient forward movement of the passenger's body under sudden vehicle deceleration, causes the reel to lock up against a further outward belt movement. Also there may be used other known reel forms which lock up in repsonse to sensed deceleration, sensed either by means in the reel unit or by external means controlling a powered reel lock up. Such reel devices are comprehended in the term inertial reel as herein used.

Figure 2:
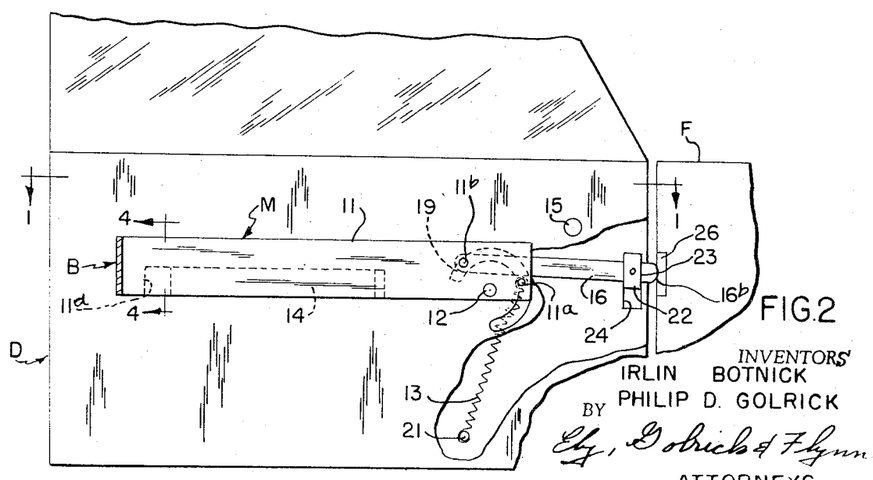
FIG. 2 again in a generalized representation, is an inside vertical elevation of the door region to show the disposition of the linkage with the door closed as in FIG. 1.
Figure 3:
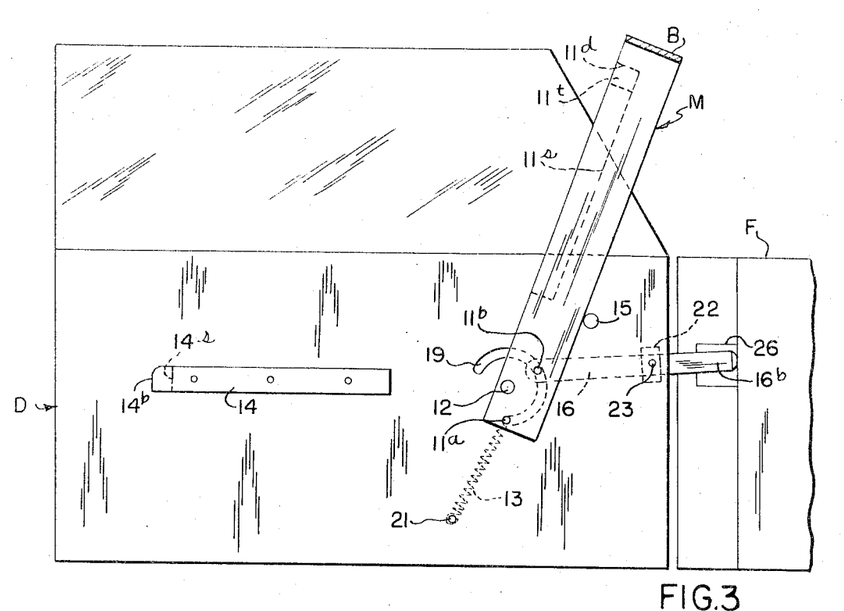
FIG. 3 is a view like FIG. 2, but with the door in an open position to show the corresponding disposition of the elements of the strap shifting mechanism.

As seen in FIGS. 2, 3, and detailed FIG. 4, the door mounted strap shifting and anchoring mechanism comprises a lever element 11 (having padding not shown, for arm-rest purposes) mounted on an appropriately reinforced region of the door by a pivot stud 12 to swing upon door opening, under the bias of a tensioned helical spring 13, from the generally horizontal position of FIGS. 1 and 2 resting on and over the stabilizing stop and abuttment member 14, upwardly and forwardly to the position of FIG. 3 against the stop 15 projecting from the door; this swing occurring under the control of a rod 16 engaging the door post face of the cowling structure F. Upon door closing, rod 16 serves as a push-rod to return the arm rest M, i.e., the element 11, to horizontal safetying position.

Short effective lever arms are defined relative to the pivot 12 by the pins 11a, 11b projecting from the element 11 through a panel slot 19 concentric with pivot 12. To these front and rearward pins are respectively attached within the door the upper end of spring 13 with its lower end secured on an inside anchor pin 21, and the pivoting back end of rod 16. By the pivoting support and guide block member 22, having opposed trunnions or pivots 23 journaled in bracket means 24 within the door, the rod 16 is longitudinally slideably mounted to project through the door front edge with its rounded front end 16b engaging the door post, preferably in a curved guide or seat plate 26 which is appropriately concavely formed to allow swinging of the rounded rod end 16b both in horizontal direction and with slight vertical pivoting as required with arm and door swing and imparted by the shift of its pivot or connection 11b.

The guide or rod contact plat 26, actually readily accommodated in the free space provided in the typical auto body structure door front edge and the door post back face, presents a concavely curved face affording a guiding seat for the push rod rounded front end 16b. Hereinafter in discussions of operation, when reference is made to contact of the push rod (or analogous element) with the door post contact with such a plate 26, when present, is to be understood.

To afford a stabilizing further connection to the door for the swingable arm 11 when it is in horizontal safety disposition, the member 14, having an extended length securely anchored to the door interior panel, is accommodated in a bottom recess 11s in the arm to provide at its back end an abuttment face 14b engageable with a co-operating internal abuttment shoulder 11d forming the rear of the arm recess. Also as designated by 14s, at the back end of 14, either a recess on the doorward vertical face or a vertical end slot receives a tongue or lip 11t downwardly projecting at the back of the arm. Hence forces developed by the passenger's body engaging the belt B and tending to pull the arm forwardly on or away from the door, are taken by the element 14, preventing destructive force application at the arm pivotal mounting.

Considering the situation shown in FIGS. 1 and 2 with a person seated, the door closed, and the arm rest in horizontal position, the safety harness is properly located about the person's torso; the elements of the harness, namely the belt strap B and the shoulder straps of N, being drawn into the operative disposition shown by the afore-described type of reels.

When the door is opened swinging outwardly and forwardly about its front edge hinge pivots, the reels allow belt and shoulder strap unreeling, hence the door opening; and as pressure against the forward end of the rod 16 is thereby relieved, the stretched tension spring 13 contracts to swing the arm rest M upwardly and forwardly towards the position against the stop 15 as shown in FIG. 3; the rod 16 advancing, and maintaining contact with the front door post.

This movement of the back end of the arm rest M accordingly carries the attached end of the belt strap portion B and so also the belt-attached shoulder strap portion of the harness upwardly and forwardly, so that as the door is opened the harness is automatically taken clearly away from the seat position permitting convenient alighting of the person from the vehicle, or convenient entrance into the seat position.

When the door is closing, the rod is pressed inwardly sliding in the pivoting guide 22, thereby pushing the arm rest backwards against the opposing force of and stretching the spring 13, until the arm rest again is brought horizontal and into co-operating engagement with the stabilizing member 14. During the return arm swing, the anchoring reels at A and C, by their spring produced in-reeling action, take up the respective straps, thus bringing the harness automatically into proper operative disposition relative to a seated passenger without any action of the passenger's part required to be directed specifically to safety.

With a suitable modification of the arm 11, as hereinafter described, a belt strap reel may be incorporated in the arm rest M, the anchor device A then being a simple anchoring element to secure the belt strap inner end non-extensively to the flooring or other rigid part of the vehicle as known and suitable.

Further by provision of the reel in the arm rest of each of two opposite doors, the belt may be carried across the entire vehicle seat width from one door to the other as a convenient way of providing a belt strap arrangement for three seat positions of the common usual seat structure across the width of the vehicle.

Figure 5:
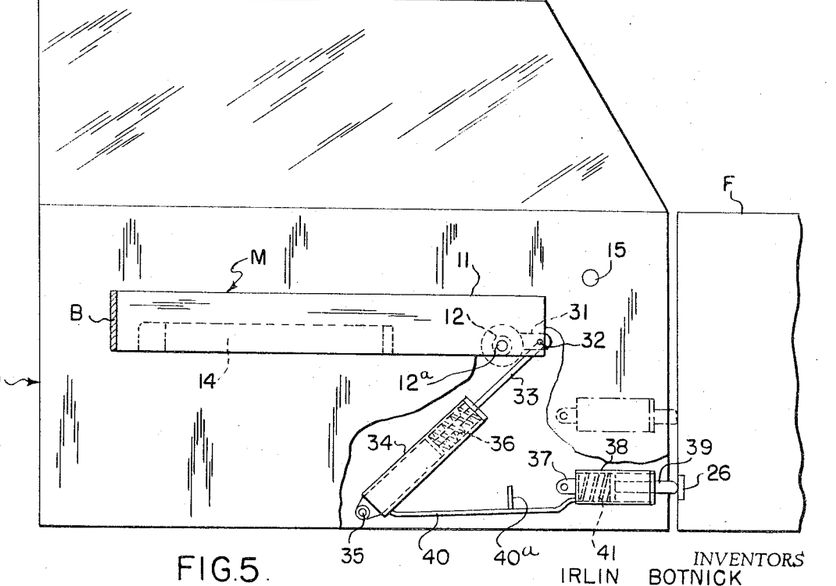
FIG. 5 is a representation similar ro FIG. 2 of a second embodiment.

By another modification shown in FIG. 5, the above described belt securing and shifting arm rest M may be actuated by hydraulic means thereby to simplify various aspects of structure, installation, operation and maintenance, since several components required in FIGS. 1–4 can be omitted; namely, the spring 13, the pivotal sliding support for the push rod 16, pins 11a and 11b and door panel slotting therefor; and a greater convenience in location of operative elements may be achieved.

With this FIG. 5 arrangement the arm 11 may be pivoted at 12 on a hollow pivot sleeve through which an arm-connected shaft projects to the door interior, where adjacent the panel it carries a lever arm 31 having an outer end pivotly connected at pivot pin 32 to the piston rod 30 of a hydraulic cylinder unit 34 having its opposite end pivotly secured to the door by a pivot pin 35 approriately engaged in bracket means internal to the door. A bias spring, disposed externally parallel to the cylinder unit 34 and connected between arm 31 and the brackets for pin 35 or disposed as at 36 coaxially of the piston rod internally of the hydraulic cylinder unit 34 between piston and cylinder end, retracts the piston rod, thereby tending to lift the arm whenever the door is opened.

A second hydraulic cylinder unit 38 by pin 37 is appropriately anchored within the lower door region with its piston rod 39 projecting through the door forward edge to engage the door post face, as previously described with respect to the acuating rod 16 of FIGS. 1–3; a guide plate 26 being secured on or in the adjacent door post of the body to define a contact path engaged by the end-rounded piston rod 39. Preferrably a bias spring is used to urge extension of the rod 39 from its cylinder, such as spring 41 disposed within the cylinder between the piston and the cylinder bottom end wall. It will be observed that this second spring also aids producing the tendency for the arm to rise toward the upward position as shown in FIG. 3 for the previous embodiment.

Hence, with a hydraulic line 40 between the bottom and inward ends of the cylinders 34 and 38, as the door is opened spring 41 urges the piston and the piston rod 39 outwardly, maintaining the post contact; the spring 36 urges the piston rod 33 inwardly and the belt carrying the arm M to swing upwardly transferring fluid from 34 to 38. Conversely upon door closing, inwardly movement of 39, forcing the piston inward against the bias spring 41, displaces fluid from 38 to 34 thereby extending rod 33 returning the arm M and belt B to operative safetying disposition. With the arm cylinder unit connected for any reason to the arm on the left of 12, and line 40 then connected to contract the unit on applied pressure, there would be used either the spring disposition of unit 38 or an external tension spring acting say at 32.

At a hydraulic fitting or line branch 40, a filling connection may be used in the line 40 for fluid make-up as might be ultimately required by leakage; and likewise a connection may be made to line 40 to put a second cylinder unit similar to and in parallel with 38 at another elevation on the door edge as may be desirable from other design considerations, of relative cylinder sizes, piston areas, small operating piston travel because of an otherwise preferred location of a piston rod 39 closer to to the door hinge axis. Also double acting cylinders may be used with corresponding hydraulic connections, especially if rod 39 is secure to the door post by swingable pivot anchor (such as 65 hereinafter described with respect to FIGS 6–7) and, to permit the necessary slight horizontal swing of cylinder 38, its anchor pin 37 is vertically disposed; an arrangement which enables elimination of the bias springs.

Figure 6:
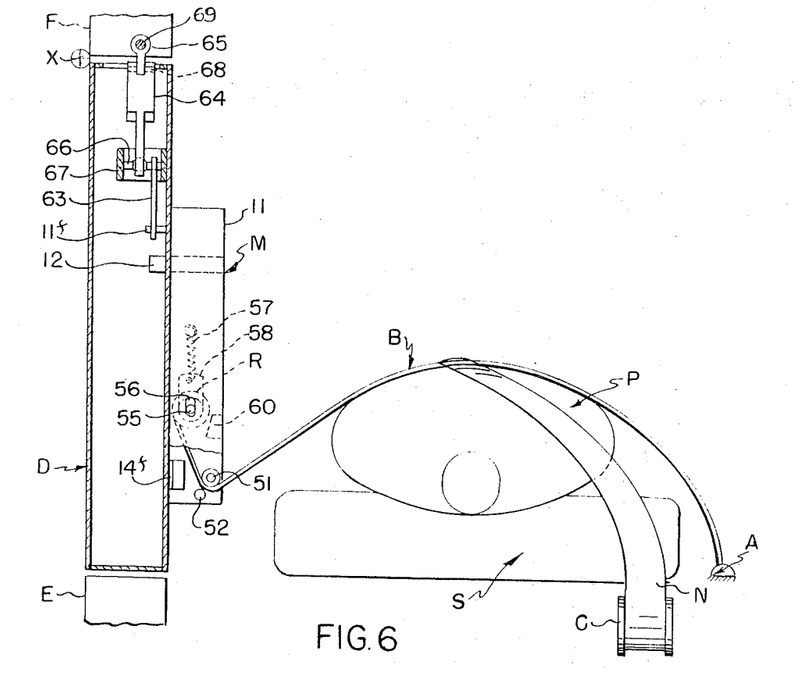
FIG. 6 shows a third embodiment of the invention by a view similar to FIG. 1, with a closed door.
Figure 7:
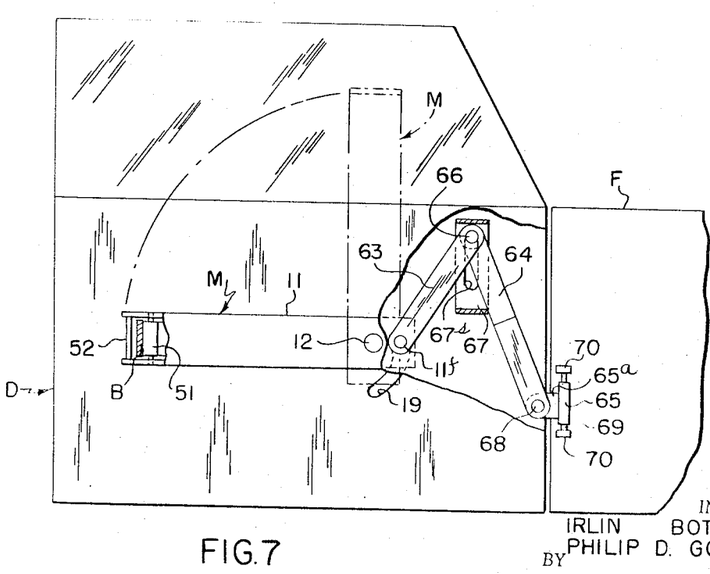
FIG. 7 is an inside vertical elevation for the modification of FIG. 6.
Figure 8:
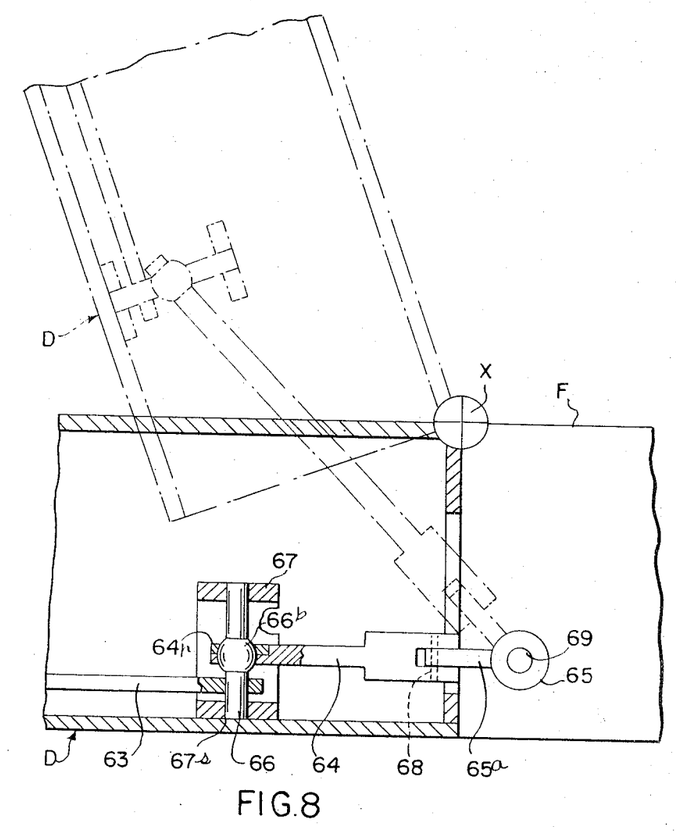
FIG. 8 is a detail of a linkage point on the mechanism of FIGS. 6-7.

A third embodiment of the invention presented by FIGS. 6–8, again utilizes a mechanical linkage between the door and door post. The form of the arm rest M with lever arm 11, pivot 12 and mode of attachment and stabilization on the door may be practically identical to what has been described for the preceeding figures with a reel incorporated in the anchor device at A. however, with an alternate provision for the belt strap reel here shown, the inner end of the belt strap B may be simply anchored or secured at A, and the doorward strap end is unreelable for door opening and other purposes, being attached to the door by a spring inwinding reel device R within an arm recess and associated guide means in the arm M.

Again a stabilizing connection, such as that provided through abuttment member 14 in FIGS. 1–5 may be provided at the element 14f.

At the rearward end of the arm element the outer belt end portion passes through guide means, the spaced roller 51 and retainer 52, tracking over roller 51 to wind on to the reel device R. The reel, including a known arrangement of an internal spring tending to wind the belt, has the projecting upper and lower ends of a mounting rod or shaft 55 (which also serves as an internal reel spring anchor) flattened for a non-rotating and fore-and-aft slideable engagement in respective short slots 56 in recess top and bottom wall portions of the arm body 11 defining the aforesaid recess, which may open against the door panel. The reel spool is lightly biased forwardly from the inwardly projecting wedge block 60 by means within the armrest, including a spring 57 and U-shaped yoke 58, through perforated arms of which shaft 55 projects into the described slots 56.

With an appropriate spring 57, the door can be opened smoothly and normal body movements of the paseenger P are possible with belt unreeling; but upon incipient fast unreeling as by body weight thrown suddenly against the belt B, the reel shifts rearwardly in the slots bringing the belt-wound convex surface there-of against the inclined surface at 60 to block unreeling, with the very force on the belt increasing the wedging engagement on the sloped surface of wedge 60. thus there is provided a novel arrangement, as an inertial reel.

Alternatively for this embodiment, at the location of reel spool R, there must be used a reel of the type previously described for reels at M or A in FIGS. 1–3; and such reel may be simply non-shiftably mounted within the armrest thus eliminating the spring biased yoke and the locking wedge. Also where as here the lengthening of the belt for door opening is provided by a reel device at the door, in most cases the reel C need not be inertial reel, but rather a simple spring retracting reel allowing a few inches only of strap unreeling to accommodate normal body movements, and allow some angular displacement of the belt reach from anchor to arm on the open door.

The strap shifting mechanism in FIGS. 6–7 further comprises the pin 11f projecting from the forward end of lever arm 11 through a downwardly rearwardly curved quarter circular slot 19 in the door panel; a link element 63; a second link 64; and swingable anchor 65 mounted on the door post or on a door post recess. The lower end of 63 is pivotally connected to arm 11 by engagement on pin 11f, and its opposite or forward end at the knee of the linkage is quasi-universally pivotally connected to link 64 by a vertically shiftable pivot pin 66 (see FIG. 8) having opposite ends slidably engaged and guided in vertically extending guide slots 67s of slideway bracket means 67 mounted within the door. The pin 66 has a ball formation or a spherical enlargement 66b engaged in a corresponding hole forming a part of a spherical seat in link 64, and therein held by securing plate means 64p having a similar partial seat forming aperture. The link 64, projecting out of an aperture in the dorward edge of the door (with suitable lateral clearances; see dot-dash positions for door open condition in FIG. 8) is pivotally connected by a horizontal pin 68 through a rearwardly projecting lug 65a of a swingable anchor 65; the latter being pivotally swingably supported on a vertical pivot shaft 69 between support bracket or mounting lug means 70 on, or in a recessed portion of, the forward door post. The linkage, of course, may be arranged with the knee or apex downward.

With the vertical axis of the swingable anchor member 65 offset parallel to the vertical door hinge pivoting axis X as shown, (and certain laterally shifting permitted between the linkage element in the span between the pin 11f and pivot 70 including movement at slideable pivot 66) upon door opening (see FIG. 8), as the vertical slideway means 67 swings at constant radius relative to the door pivot axis X from which in turn 70 is eccentric, the vertically slideable pivot 66 is pulled downward by link 64 in the slideway slot 67, correspondingly displacing link 63, thereby swinging the arm rest M upwardly 90° and forwardly to the position shown in dot-dash lines in FIG. 7. Conversely in the door closing, the reverse motion returns the arm rest and strap to the safetying position of FIG. 6.

Thus as in the previous embodiments, upon door opening the door-attached portion of belt strap B automatically is swung upwardly and forwardly away from the seat position, the belt unreeling as required from either the arm rest or the anchor device A as the case may be; and automatically upon door closing, as the door swings inward the belt is reeled up by the reel spring mechanism and the doorward end of arm M is swung downwardly again bringing the belt B and strap N into the proper operative or safetying disposition across the body or torso of the passenger.

Figure 9:
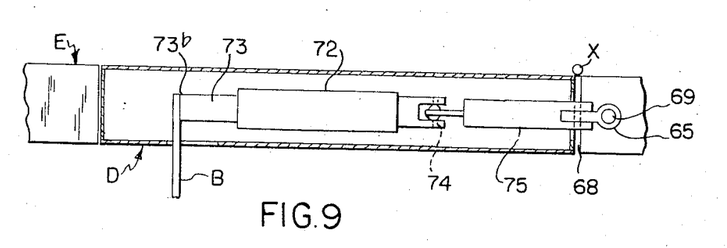
FIG. 9 shows a fourth embodiment of the invention by a generalized horizontal schematic plan section at a closed door.
Figure 10:
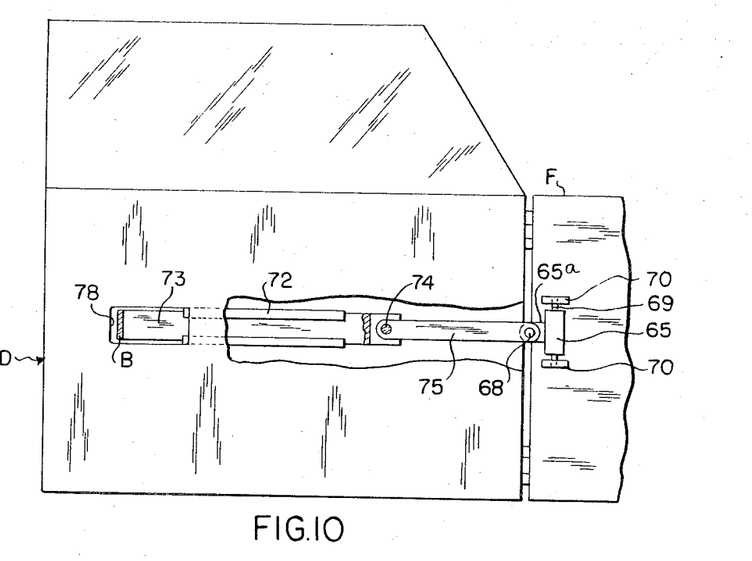
FIG. 10 ia a vertical elevation for the modification of FIG. 9.

In the form of the invention shown in FIGS. 9 and 10, a slideway 72 firmly fixed in the door supports and guides, for only a for-and-aft movement, a slideable arm or carriage member 73 at its forward end pivotally connected by pin 74 to a link 75 (such as previously described link 64) projecting through the forward door edge again to a connection as previously described at a swingable pivotal anchor member 65 similarly offset from the door hinging axis. Pin 74 is similar to pin 66 of FIG. 8 in having a ball enlargement for a quasi-universally pivotal reception of link 75; but the pin ends are simply engaged in the opposite sides of a bifurcated front end of slide member 73.

As shown, with the slide 73 and slideway 72 mounted entirely within the door, the doorward end of the belt extends through a door panel slot 78 for attachment directly to the slide back end at 73b; with the other belt end then secured by an inertial reel type anchor as at A in FIGS. 1–3. Here a more limited but yet useful to-and-fro excursion of the belt end relative to the seat is attained upon the door closing and opening.

Alternatively the slideway 72 may be mounted externally, that is, on the door panel face adjacent the seat, with a forward pivot connection pin at 74 projecting through a corresponding door panel slot (similarly to the pin 11f in FIG. 6) to engage with a quasi-universal pivot connection at the rear end of the link 75. In either case, also there may be used a reel of any of the types described with respect to FIGS. 6-7 carried in the back region of the slide 73. With support 72 mounted on the seatward face of the door, a channel-shaped cover, secured over the length of 73 with clearance for 72, may be appropriately padded to form an armrest. To gain greater belt shifting motion, the modification of FIG. 11 may be used, though with loss of the positive connection to the post provided by FIGS. 9–10.

Figure 11:
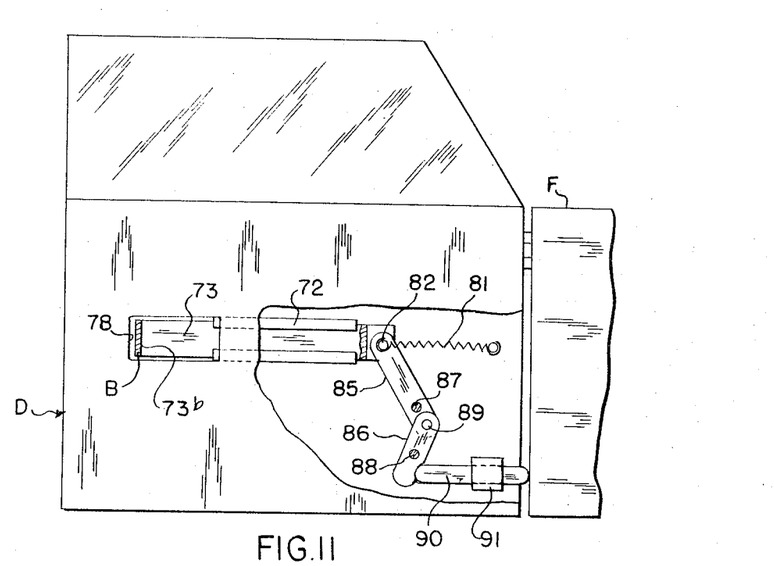
FIG. 11 shows a modification of the FIGS. 10-11 invention form by a view similar to FIG. 10.

In FIG. 11, slide 73 is forwardly biased by spring 81 and, by a simple pin 82, is connected to the first of two links 85 and 86 respectively pivoted at 87 and 88 within the door structure and themselves connected by pivot pin 89 to form a motion multiplying linkage. A horizontal slide bar 90, slideably supported within the door by a slideway bracket 91, projects again out of the door front edge, with its rounded front end bearing against the door post, preferably on a guide seat plate, as described for FIGS. 1–3. The back end of rod 90 either bears upon an arcuate seat of or is pivotedly connected to the lower end of lever link 86. Where the slide arm member 73 is mounted within the door, the door panel again is slotted to accommodate the belt excursions; but again the options are available of having an exterior mounting for providing an arm rest, and for the location of the belt strap reel, as previously described with respect to FIGS. 9 and 10.

In FIG. 11 upon door opening, thereby allowing rod 90 to advance further out of the door with a corresponding freedom for motion in the linkage system and hence in the arm, the slide 73 is advanced, for belt movement forwardly away from the seat position essentially by tensioned spring 81. Upon door closing, the rod 90, being pressed inward, actuates the linkage against the bias of and tensioning spring 81 to return the slide and the belt strap to safety position; and as in all the previous figures, the closed door holds the rod 90 depressed into the door as part of means locking the belt carrying arm member in position providing a safetying disposition of the strap means.

For the pivoting arm rest forms of the invention, in preference to mechanism modification involving damper device, additional springs, lost motion connections and terminal locks for the arm, simple arcuate guard plate may be provided as a skirt depending from and below the inner bottom edge of the arm rest to block hand or arm insertion between the door sill and raised armrest to prevent injury to the passenger upon armrest descent; and further to the same end, with additional stabilization of the arm rest as may be afford by a plate guiding elongated lip on the door, a grip for closing the door may by carried by the guard plate or armrest.

In all of the aforegoing, the safety harness, strap portions or strap elements are operatively permanently connected to each other and to the environment; yet convenient exit and entrance into the seat is provided; and the straps are brought into operative position automatically, the passenger in this being passive.

We claim:

1. Passive safety strap rigging for an occupant of an automotive vehicle seat adjacent a door with the front edge thereof hinged to the vehicle chassis for outward forward opening swing away from the seat space, comprising:

a belt strap having a first end portion secured to said door adjacent one side of a passenger seat location and the second end portion secured to the vehicle on the other side of the seat location to extend in safetying restraining disposition across the body of a person occupying the seat location;

an anchor device as securing means for the second end portion of the belt strap affixed to the vehicle;

one of said securing means including a self-retracting reel enabling unreeling of a respective belt end portion at a rate allowing normal door opening and normal bodily movement of a seat occupant, but locking up against unreeling to restrain the occupant upon vehicle deceleration;

belt shifting mechanism comprising a member mounted to the door, and as the respective said securing means, having the said first end portion secured thereto, said member being a slide member slidably supported in a slideway mounted to said door and shiftable generally horizontally for a fore-and-aft movement carrying the respective belt end portion with a forward component away from a position near the seat where the belt is held in safetying disposition across the seat;

means carried by the door and including an element engaging a fixed chassis part adjacent the door and force transmission means connected between said element and said member for communicating door swing motion to, and thereby energy applied through mediation of the door on door closing to, said member to force return of said member with the belt to a safetying disposition and controlling movement of said member away from the seat location to progress forwardly on the door with door opening swing, whereby the doorward end of the belt is moved away from the seat position to aforesaid convenient exit and ingress when the door is opened and by door closing is returned to a rearmost position with the belt in safetying disposition.

2. Passive safety strap rigging as described in claim 1, wherein said slide is spring biased to move forwardly relative to the door, and said element comprises a push rod with front edge projecting through the door edge into engagement with the adjacent door post of the body; and including motion multiplying linkage between the rear end of the rod and the said slide member.

3. Passive safety strap rigging as described in claim 2, including a shoulder strap having one end secured to a vehicle upper region behind said seat by a second reel and the other end secured to the said belt strap.

4. Passive safety strap rigging as described in claim 2, wherein said reel is disposed in said anchor device.

5. Passive safety strap rigging as described in claim 2, wherein said slide and slideway are disposed within the door.

6. Passive safety strap rigging as described in claim 2, wherein said slide and slideway are mounted on the inside face of the door; and said slide is adapted to serve as an arm rest.

7. Passive safety strap rigging as described in claim 1, wherein said element comprises a rod extending through the door front edge to a horizontally and vertically pivoting front end connection with the adjacent door post of the body, and at its rear end having a limiting universally pivoting connection to said slide member, whereby opening and closing movements of the door impart a fore-and-aft motion to the slide member.

8. Passive safety strap rigging as described in claim 7, wherein said slide member is disposed on the inside face of the door and is adapted to serve as a arm rest for the seat occupant.

9. Passive safety strap rigging as described in claim 7, wherein said slide member is disposed within the door, and the inside door panel is slotted to accommodate the respective belt end portion attached to the slide member.

* * * * *